United States Patent [19]

Samanta

[11] 4,220,461
[45] Sep. 2, 1980

[54] LOW TEMPERATURE SYNTHESIS OF VITREOUS BODIES AND THEIR INTERMEDIATES

[76] Inventor: Mrinmay Samanta, P.O. Box 2322, Washington, D.C. 20013

[21] Appl. No.: 894,188

[22] Filed: Apr. 6, 1978

Related U.S. Application Data

[63] Continuation-in-part of Ser. No. 827,725, Aug. 25, 1977, abandoned.

[51] Int. Cl.$^2$ .................. C03B 19/00; C03C 11/00
[52] U.S. Cl. ........................................ 65/22; 65/17; 65/DIG. 14; 106/40 V; 106/47 R
[58] Field of Search ............... 65/17, 22, DIG. 14; 210/22; 106/40, 47 Q, 47 R

[56] References Cited

U.S. PATENT DOCUMENTS

| | | | |
|---|---|---|---|
| 2,106,744 | 2/1938 | Hood et al. | 106/36.1 |
| 2,326,059 | 8/1943 | Nordberg | 106/52 |
| 2,336,227 | 12/1943 | Dalton | 65/31 |
| 2,480,672 | 8/1949 | Plank | 65/31 |
| 2,505,001 | 4/1950 | Nordberg | 65/32 |
| 2,861,351 | 11/1958 | Smith | 34/7 |
| 2,886,404 | 5/1959 | Teja | 65/2 |
| 2,982,053 | 5/1961 | Elmer | 65/31 |
| 3,232,782 | 1/1966 | Shannon | 428/337 |
| 3,459,522 | 8/1969 | Elmer et al. | 65/30 |
| 3,535,890 | 10/1970 | Hansen et al. | 65/18 |
| 3,560,400 | 2/1971 | Chilton | 210/22 X |
| 3,597,252 | 8/1971 | Schroder et al. | 65/17 X |
| 3,678,144 | 7/1972 | Shoup | 106/40 X |
| 3,699,050 | 10/1972 | Henderson | 65/21 X |
| 3,785,793 | 1/1974 | Park | 65/31 |
| 3,827,893 | 8/1974 | Meissner et al. | 106/74 |
| 3,884,550 | 5/1975 | Maurer et al. | 65/3 |
| 3,938,974 | 2/1976 | Macedo | 65/3 R |
| 4,059,658 | 11/1977 | Shoup et al. | 106/38.35 |
| 4,062,665 | 12/1977 | Izawa et al. | 65/3 A |

OTHER PUBLICATIONS

Molecular Engineering of Silica-Rich Glasses Produced by Phase Separation (Ph. D. Thesis of M. Samanta, Catholic University, 1975).

*Primary Examiner*—Arthur D. Kellogg
*Attorney, Agent, or Firm*—Mrinmay Samanta

[57] ABSTRACT

The disclosure is directed to a method of making glass via solution deposition of a porous self-supporting body by combination of a first solution and a second solution. The first solution containing at least one basic glass forming solute is confined within a porous container, the walls of which are substantially impermeable to the basic solute. The second solution containing at least one acidic solute is diffused into the porous container through its walls which are substantially permeable to the said acidic solute. Within the porous container the combination between the first solution and the second solution takes place leading to the deposition of a self-supporting porous body on the inside walls of the container. The porous body which is crystalline, vitreous or intermediate between the two, is purified by leaching and/or washing, dried and thermally consolidated to a transparent non-porous glass.

39 Claims, No Drawings

LOW TEMPERATURE SYNTHESIS OF VITREOUS BODIES AND THEIR INTERMEDIATES

CROSS REFERENCES OF RELATED APPLICATION

This application is a continuation-in-part of copending application, Ser. No. 827,725 filed Aug. 25, 1977 now abandoned.

FIELD OF THE INVENTION

This invention relates to a novel method for making a vitreous body and its intermediates. More particularly, the method relates to a low temperature production of a vitreous body via synthesis of a self-supporting body by solution deposition.

DESCRIPTION OF THE PRIOR ART

In recent years, the most commonly employed commercial process for the manufacture of glass is the direct melting process. This process is somewhat tedious and has not been very successful in the melting of easily devitrifiable and high refractory glass. Many of the latest technological advances demand glass to be in a state of high purity which is seldom met in a direct process. Operational cost of the direct process is energy-sensitive and recurring energy crises continue to have significant impact on glass making operations. Consequently, a method for preparing glass at low cost, in a state of high purity and in relatively unlimited composition is needed.

A number of indirect processes, namely, anodization, shockwave treatment, and neutron bombardment, have been proposed, but their use has never been realized on a large scale. These processes severely limit the operational flexibility and in most cases, the production cost is higher than for the direct process.

In U.S. Pat. Nos. 2,480,672, 2,106,744 and 3,785,793, for example, a process is disclosed wherein the silica content of an easily meltable alkali-borosilicate glass is enriched by phase separation and leaching. The porous glass which is obtained as an intermediate product is thermally consolidated at elevated temperature. Although the process is comparatively inexpensive, it suffers from the limitation with respect to choice and regulation of glass-forming compounds. Choice and regulation of modifying compounds can, however, be achieved via a doping operation in the pores of the porous glass. Physical doping operations are disclosed, for example, in U.S. Pat. Nos. 2,336,227, 3,232,782, 3,938,974 and in the Ph.D. Thesis of M. Samanta, "Molecular Engineering of Silica-rich Glasses Produced by Phase Separation," Catholic University of America, 1975. A chemical doping process is disclosed in a pending application, Ser. No. 832,230 filed Sept. 12, 1977 by M. Samanta.

High purity glass has been prepared by a vapor deposition process as described, for example, in U.S. Pat. Nos. 2,326,059, 3,884,550 and 4,062,665 among many others. In such a process vitreous silica is deposited in the form of a self-supporting porous body singly or in combination with a dopant. This process is expensive and the shape of bodies obtainable from such a process is limited.

Polymerization processes have been tried for glass making with limited success. Two distinct lines of approach have been attempted. First is the concentration of a colloidal solution under controlled conditions as described, for example, in U.S. Pat. Nos. 2,886,404 and 3,535,890. Second is the interaction in solution between a silicon compound and a polymerizing agent therefor, as described, for example, in U.S. Pat. Nos. 3,678,144, 3,827,893 and 4,059,658. The main difficulty in both lines of approach is the large shrinkage accompanying the process which makes the glass susceptible to breakage and which presents a potential problem in the design of molds.

SUMMARY OF THE INVENTION

In the process of the present invention, first and second solutions separated by a permeable barrier are provided. The first solution contains at least one basic or alkaline glass forming solute and the second solution contains at least one acidic solute with the permeable barrier being substantially permeable to the acidic solute but substantially impermeable to the basic solute. When the first solution and the second solution are originally at suitable concentrations, passage of the second solution through the barrier occurs and a chemical combination takes place resulting in the deposition of a porous self-supporting body on the side of the barrier in contact with the first solution. The porous body can be purified, dried and thermally consolidated to a non-porous glass.

DETAILED DESCRIPTION OF THE INVENTION

The present invention facilitates an economical mass production of vitreous bodies in a state of high purity and in virtually unlimited shapes. According to this invention, a porous self-supporting body deposits on a substrate, when a first solution containing a suitable concentration of at least one basic glass forming solute is allowed to react, on the substrate, with a second solution containing a suitable concentration of at least one acidic solute. When the concentration of the acidic solute in the second solution falls outside the range of suitable concentrations, amorphous or crystalline particles result with no interconnectivity. The broadness of the range of appropriate concentrations depends on the particular type of reaction and can be determined experimentally by trial and error. The first solution and the second solution are separated by a permeable barrier the walls of which act as a substrate for deposition of a porous self-supporting body. The second solution is diffused through the barrier which is substantially permeable to the acidic solute but substantially impermeable to the basic glass forming solute. This assures a reaction between the first solution and the second solution on the barrier to deposit a porous self-supporting body.

The nature and composition of the solutions which are useful for glass formation are shown in Table 1 (first solution) and Table 2 (second solution). The solutions may be binary (containing one solute) or multicomponent (containing more than one solute). The solvents useful for the purpose of making a solution may be water, hydrocarbons such as benzene, alcohols such as methanol, ketones such as acetone, ethers such as diethyl ether, carboxylic acids such as acetic acid and mixtures thereof.

Table 1

First solution

All solutions contain moderately high to very high concentrations of the basic glass forming solute. The solutions may be true solutions or colloidal solutions.

| Group to which the glass-forming element of the solute belongs | Examples of the Solute |
|---|---|
| Group III-A of the Periodic Table | Borates, aluminates |
| Group IV-A of the Periodic Table | Silicates, germanates, stannates, plumbates |
| Group V-A of the Periodic Table | Phosphates, arsenates, antimonates, bismuthates |
| Group VI-A of the Periodic Table | Selenates, tellurates |
| Transition metal Group of the Periodic Table | Zirconates, titanates, tungstates, vanadates, molybdates |

The solutes exemplified in the above table may be simple solutes or complex solutes. Simple solutes are those which are combinations of two different oxides; complex solutes are those which are combinations of more than two oxides. An example of the simple solute is the silicate $Na_2O \cdot xSiO_2$ where $x=2$ to 4 available in commercial water glass solution. An example of the complex solute is the silicate or borate, $K_2O \cdot 2B_2O_3 \cdot 3SiO_2$ which can be made synthetically. A convenient method for making an aqueous solution of a simple solute or complex solute is to mix suitable raw materials in desired proportion, fuse the mixture at high temperature and finally treat the fused mass with hot water with or without the use of pressure. Other methods include dissolving amorphous oxide in hot aqueous alkali. In many cases the aqueous solutions of the simple solutes or complex solutes are turbid, presumably due to the homogeneous distribution of some undissolved solute in colloidal dimension. In cases where more than one basic glass forming solute is used complications might arise due to the interaction of two solutes leading to the formation of a gel. As an example, the interaction of sodium silicate and sodium aluminate in aqueous solution leads to the formation of a gel. The problem can be avoided by using a low concentration of one solute so that gel is formed in small amounts which can be dispersed throughout the solution in colloidal dimension.

The preferred concentration range of the basic glass forming solute in the first solution should be such that it will be able to provide from 0.10 mole to 40 moles of glass forming oxide from 1 liter of solution. Stronger or weaker concentrations may also be used to tailor the process to the product desired. In case more than one basic glass forming solute is present or in case the basic glass forming solute is a complex one the first solution should be able to provide from 0.10 moles to 40 moles of at least one glass forming oxide.

Table 2

Second Solution

Most solutions should contain very low to moderately high concentrations of the acidic solute; very high concentrations have been found to be useful in special circumstances. The concentration range of the acidic solute in the second solution depends on the concentration of the first solution and can be ascertained by trial and error. The solution must be a true solution.

| Type of Solute | Examples of the Solute |
|---|---|
| Salts of strong acid and weak base | Salts of Group I-B elements of the Periodic Table such as $CuSO_4$, $AgNO_3$, $AuCl_3$ Salts of Group II-A elements of the Periodic Table such as $Mg_3(PO_4)_2$ $CaCl_2$, $Sr(NO_3)_2$, $BaCl_2$ Salts of Group II-B elements of the Periodic Table such as $ZnCl_2$, $CdSO_4$, $HgCl_2$ Salts of Group III-A elements of the Periodic Table such as $Al_2(SO_4)_3$, $TlNO_3 InCl$ Salts of Group IV-A elements of the Periodic Table such as $Pb(NO_3)_2$, $SnCl_2$ Salts of Group V-A elements of the Periodic Table such as $SbCl_3$, $Bi(NO_3)_3$ Salts of Group VI-A elements of the Periodic Table such as $TeBr_2$ Salts of transition metal group of the Periodic Table such as $TiCl_4$, $FeSO_4$ $Zr(NO_3)_4$, $NiCl_2$, $PdCl_2$ $La(NO_3)_3$ Ammonium and substituted ammonium salts such as $NH_4Cl$, $NH_4NO_3$, $(NH_4)_2SO_4$, $(NH_4)_3PO_4$, $(NH_2OH, HCl)$ $(NH_2NH_2, HCl)$ |
| Acids | Inorganic acids such as $HCl$, $H_2SO_4$, $HNO_3$, $H_3PO_4$ Organic acids such as $CH_3CO_2H$, $HCO_2H$, $(CO_2H)_2$ |

The permeable barrier used in this invention has three different purposes. First, it provides a differential permeability between the two solutions. Second, it has a control on reaction rate by virtue of the thickness, the porosity and the pore-size of the walls. Third, in the early stage of the reaction, it is a substrate for the deposition of a film of a self-supporting porous body. Permeable barriers in the form of porous containers may have the shapes of tubes, cups, hollow spirals or any shapes conforming to the shape of the article to be made for household or commercial purposes.

The rate of deposition of the porous body depends on the rate of reaction which is initially controlled by the porosity, the pore-size, the thickness of the walls of the porous container, the temperature, the pressure and the concentration of the solutions. With passage of time, the substrate for deposition is no longer the walls of the container, but a film of porous body already deposited. The porosity, pore-size and thickness of the deposited film should thus be considered as additional variables in assessing the rate of deposition. The larger the porosity and the pore-size of the walls of the porous container and/or the deposited porous film, the larger is the reaction rate. The larger the thickness of the walls of the porous container and/or the deposited porous film, the smaller is the reaction rate. The rate of chemical reaction is directly proportional to the concentration of the reactants. Temperature has a direct bearing on the reaction rate; the higher the temperature, the higher is the reaction rate in general. The process may be carried out at temperatures varying from the solidification point of the solution to the boiling point of the solution. Finally, the effect of pressure on the reaction rate involving an impermeable component is of considerable interest. For good results the osmotic pressure of the two solutions should be as close as possible. In many cases, it is found that there is a rapid initial movement of the second solution into the first solution because of large differences in osmotic pressures between the two solutions. With the progress of reaction, this difference decreases because some of the impermeable component deposits out of the solution. The reaction at any stage can be controlled by using external pressure either on the first solution or on the second solution.

Various additives may be added to the first solution and/or the second solution to have the desired effects. Suitable additives include peptizing agents, protective colloids, coagulating agents, structure modifiers and composition modifiers. Additives may be present in the first solution as dissolved solute or in homogeneous suspension. They increase the viscosity of the solution and offer resistance to the movement of the basic solute which is desirable for producing a self-supporting structure. The additives may co-deposit in the porous body, thus modifying the properties of the latter. Co-deposited additives may be leached out from the porous body to increase the porosity and pore-size. Additives for the second solution must be present as dissolved solute. They may increase the pH buffering capacity and/or the osmotic pressure of the second solution which is desirable.

The porosity and pore-size of the porous self-supporting body are found to be directly proportional to the concentration of the second solution and inversely proportional to the concentration of the first solution. Thus, an asymmetric distribution of pore-sizes in the deposited porous body can be achieved merely by proper manipulation of the concentrations of the solutions at various instants of the process. It has been found that washing the deposited porous body with water increased the pore diameter and the porosity to a small extent due to the slight dissolution of the porous skeleton by a solution of unreacted basic solute.

The thickness of the deposited porous structure is a function of duration of combination. The duration of combination also determines a composition profile within the porous body. A portion of the porous body near the walls of the porous container has more complete deposition than a portion far from the walls. This profile in composition can be destroyed by leaching with an acid.

It has already been pointed out that depending on the concentration of the first solution, a range of concentrations of the second solution can be used to form a self-supporting porous body. When the actual concentration is high in the range of concentrations, the deposited porous body is predominantly crystalline. When the actual concentration of the second solution is low in the range of concentrations the deposited porous body is predominantly vitreous.

It is possible to develop in the porous body two or more layers having different composition merely by replacing the first solution and/or the second solution with a solution or solutions of different composition. This is an example of discontinuous variation of composition in the porous body. A continuous variation of composition in the porous body can be achieved by varying the composition of the first solution and/or the second solution continuously. In making a compositionally inhomogeneous porous body, the importance of both first solution and second solution has to be considered since in the deposition process, the glass forming oxide corresponding to the basic glass forming solute is deposited either singly or in combination with an oxide derived from the acidic solute.

The physically bound impurities in the porous self-supporting body can be removed by washing with water at room temperature. The composition profile in the porous body due to non-uniform deposition can be eliminated by leaching. Leaching is done with N/1000 to 3 N dilute mineral acid at temperatures varying from 25° C. to 100° C.

The porous structure can be doped physically or chemically with a modifier. Physical doping processes are described, for example, in U.S. Pat. Nos. 2,336,227, 3,232,782 and 3,938,974 and in the Ph.D. Thesis of M. Samanta, "Molecular Engineering of Silica-Rich Glasses Produced by Phase Separation", Catholic University of America, 1975. In this process, the porous body is impregnated with a solution of dopant, dried at room temperature to remove most of the solvent, heated to decompose the dopant into an oxide and finally consolidated at high temperature to incorporate the oxide. A chemical doping process is disclosed in pending application, Ser. No. 832,230 filed Sept. 12, 1977 by M. Samanta. This chemical doping process involves exchange of protons in the porous body with cations in a weak basic medium.

Most of the physically bound water in the undoped or doped porous body can be removed by room temperature drying. Rapid drying introduces tension, particularly at the cut edges of the porous body which then tends to crack. This can be prevented by coating the cut edges with a thin film of polyethylene glycol as described in U.S. Pat. No. 2,861,351. For a porous structure containing pores of 200° A. or lower, controlled drying under a relative humidity of 60–90% is preferable. Capillary forces in this case are very high and too rapid drying causes breakage of the structure.

Chemically bound water in the form of surface hydroxyl groups cannot be removed by room temperature drying. These can be removed by vacuum drying at temperatures below the consolidation temperature of the porous body as described in U.S. Pat. No. 2,505,001 or by chemical methods as described in U.S. Pat. Nos. 2,982,053; 3,459,522 and 3,535,890 wherein replacement of hydroxyl groups in the porous body is done by a halogen. An efficient chemical method is disclosed in pending application, Ser. No. 832,231 filed Sept. 12, 1977 by M. Samanta. In this method, the combination of two non-bridging hydroxyl groups in the porous body to form a single bridging oxide group is sought to be achieved in the presence of an acid anhydride.

The doped or undoped porous structure, after removal of most of the physically bound water by room temperature drying for 2 days is heated at the rate of 100° C. per hour. It is then kept at about 600° for 2 hours and chemically bound water is removed by appropriate treatment. The temperature is raised again at the rate of 100° C. per hour until the porous body is consolidated to a non-porous vitreous body. For a crystalline porous body, the consolidation temperature is close to the liquidus temperature of the consolidated glass (liquidus temperature is the maximum temperature at which glass coexists with crystal). For a vitreous porous body the consolidation temperature is close to the glass transition temperature of the consolidated glass (glass transition temperature is the temperature corresponding to the breakpoint of the specific heat versus temperature curve of a glass). For a mixed phase porous body, the consolidation temperature lies between the glass transition temperature and the liquidus temperature.

It is found that glass prepared by the process of this invention is extremely pure. Thus, in the deposition of a germania and silica porous body, impurities like Fe, Co, Ni, Cu, Cr preferentially migrate into solution. Glass made from such a porous body is highly transparent to ultraviolet, visible and infrared radiation.

In order to indicate more fully the nature and utility of my invention, the following specific examples are set forth. In all examples, tubular cellulose dialyzer membranes having an average pore diameter of 4.8 nm are used. All concentrations expressed in percentage are gms per 100 ml of solution except where otherwise differently stated. All chemicals are laboratory reagent grade chemicals except for sodium silicate and cesium nitrate.

EXAMPLE 1

In each of the following experiments, a dialyzer tube 4" in length and 0.5" in diameter is closed at one end and then filled with 40° Be aqueous sodium silicate solution (first solution). 40° Be aqueous sodium silicate solution has a composition of 6.5% $Na_2O$, 25% $SiO_2$ and 68.5% $H_2O$, all percentages being expressed in gms per 100 gms of the solution. The tube is then closed at the other end. The closed tube which has a length of 2.5" is almost filled with silicate solution and contains very little space filled with air. The tube is completely immersed in a horizontal position in 3000 ml aqueous ammonium chloride solution (second solution) for 24 hours. Because of the molecular sizes, only ammonium chloride molecules and no sodium silicate molecules can diffuse through the membrane. The results of various experiments are shown in Table 3. The average room temperature recorded during the experiments is 24° C.

TABLE 3

| Experiment No. | Concentration of aqueous ammonium chloride solution in gms per 100 ml of solution | Appearance of the deposited product within the tube | Consolidation temperature of leached, washed dried porous body |
|---|---|---|---|
| 1 | 30 | White crystalline isolated particles | — |
| 2 | 20 | White, crystalline isolated particles | — |
| 3 | 10 | White, crystalline isolated particles | — |
| 4 | 5 | White, crystalline interconnected particles Interconnected particles of which about 10% is white, crystalline and about 90% is amorphous, transparent | 1690° C. |
| 5 | 2 | | 1520° C. |
| 6 | 1 | Transparent, amorphous, interconnected particles | 1500° C. |
| 7 | 0.5 | Transparent, amorphous, interconnected particles | 1425° C. |
| 8 | 0.25 | Transparent, amorphous isolated particles | — |

Table 3 shows that against a concentration of 40° Be aqueous sodium silicate solution (first solution) concentrations of aqueous ammonium chloride solution (second solution) corresponding to Experiment Numbers 4, 5, 6 and 7 are suitable for the formation of a porous self-supporting body. Thus, against a concentration of 40° Be aqueous sodium silicate solution (first solution) the range of suitable concentrations is from 0.5% to 5% for aqueous ammonium chloride solution (second solution). Table 3 also shows that when the actual concentration of aqueous ammonium chloride solution is high in the range of concentrations, the deposited porous self-supporting body is predominantly crystalline; when the actual concentration of aqueous ammonium chloride solution is low in the range of concentrations, the deposited porous self-supporting body is predominantly vitreous.

The concentrations of the reactants useful for deposition of a porous self-supporting body, as demonstrated above, may not be suitable under a set of different conditions. Use of a membrane of different pore size, use of different temperature and use of pressure on either solution can alter the concentration of either solute available for reaction on the membrane substrate. Four deposited porous self-supporting bodies are separated from the membranes and their diameters appear to be larger than the diameter of the original dialyzer tube. This is due to the fact that in the initial stage, there is rapid absorption of ammonium chloride solution within the tube due to the large difference is osmotic pressure between the ammonium chloride solution and the sodium silicate solution. Consequently, within the tube there is a development of pressure which is partially relieved by expansion of the tube both in diameter and length. The porous bodies after washing with water 2 times, are leached with 0.01 N $H_2SO_4$ at 21° C. for 10 hours to remove sodium ions and then washed with water to remove the acids. The porous bodies after washing are dried at 21° C. for 48 hours to remove most of the physically bound water. They are heated under vacuum at the rate of 100° C. per hour. They are then held at 600° C. for 2 hours. The temperature is raised again at the rate of 100° C. per hour until the porous bodies are consolidated to a non-porous glass. Table 3 shows that consolidation temperature for a crystalline porous body is higher than that for a vitreous porous body. Theoretically, a crystalline porous body should have a consolidation temperature close to the liquidus' temperature of the consolidated glass, whereas a vitreous porous body should have a consolidation temperature close to the glass transition temperature of the consolidated glass. All four consolidated glasses are analyzed for silica, sodium and iron concentration. The average sodium concentration is 50 ppm, the average iron concentration is 15 ppb, and the average silica concentration is 99.99%. Thus, it is found that very pure silica glass can be prepared by this invention. The concentration of sodium which deteriorates the refractoriness and the concentration of iron which deteriorates the optical quality can be further decreased by using raw materials of high purity and/or using a more severe leaching condition.

EXAMPLE 2

In each of the following experiments, a dialyzer tube 4" in length and 0.5" in diameter is closed at one end and then filled with 40° Be aqueous sodium silicate solution. The tube is closed at the other end. The closed tube which has a length of 2.5" is almost filled with silicate solution and contains very little air space. The tube is completely immersed in a horizontal position in 3000 ml 50% aqueous aluminum sulfate solution for the desired time. The deposited porous vitreous body is separated from the dialyzer tube and washed with water. The wall thickness of the washed product is measured. The results of various experiments are shown in Table 4.

TABLE 4

| Average temperature of the experiments = 24° C. | | |
|---|---|---|
| Experiment No. | Duration of combination of solution in days | Wall thickness of washed, porous body in mm |
| 9 | 2 | 0.50 |
| 10 | 7 | 2.10 |
| 11 | 17 | 3.00 |

This example verifies that wall thickness of the deposited porous body is directly proportional to the duration of combination of the two solutions. In the above experiments, changes in length and in diameter of the dialyzer tubes are practically zero, presumably because the osmotic pressures of the two solutions are very close. It has to be noted that reaction between aqueous aluminum sulfate solution and aqueous sodium silicate solution is very slow. Other reactions like the reaction between aqueous ammonium chloride solution and aqueous sodium silicate solution are very fast and a considerable amount of wall thickness of porous body can be built up in a very short time.

EXAMPLE 3

In the experiments of Example 1, it is found that the shape and size of the deposited porous body were slightly different from the original shape and size of the membrane. This is due to the rapid osmotic absorption of the second solution within the tube towards the beginning of the experiment. This leads to a development of pressure and makes the membrane dimensionally unstable. In the following experiment (Experiment No. 12) the system is buffered with respect to change in pressure. A dialyzer tube 0.5" in diameter and 20" in length is closed at one end and is partially filled with 75 ml 40° Be aqueous sodium silicate solution. The open end of the dialyzer tube is fastened to a support and the tube is suspended vertically in 5000 ml 0.5% aqueous ammonium chloride solution so that 75% of the solution within the dialyzer tube is immersed in ammonium chloride solution and the other 25% of the solution stays above the ammonium chloride solution. The part of the dialyzer tube which is not filled with silicate solution remains more or less collapsed. The initial rapid diffusion of the second solution into the tube is thus prevented by a counter acting hydrostatic pressure. Further, solution diffused into the dialyzer tube is accommodated by the inflation of the collapsed portion of the dialyzer tube and this prevents any dimensional instability of the immersed portion of the dialyzer tube. After 25 hours, the deposited porous glass body is taken out and is separated from the dialyzer tube. The deposited porous glass tube is found to be perfectly cylindrical conforming to the shape and size of the dialyzer tube. The average room temperature recorded during the experiment is 24° C.

It is found that non-uniformity in deposition can be caused by variation in pressure from point to point in a porous container. This gives rise to a problem when the portion of the porous container directly involved in the deposition process has a large vertical length. This problem can be minimized or eliminated by positioning the porous container in the second solution to occupy the shortest vertical distance, and providing the porous container with a flexible non-porous closure which can expand to relieve the pressure developed in course of the process. It is preferable to have the porous container as rigid as possible and to have solutions of very close osmotic pressure. An alternative method for relieving the pressure is to provide the opening of the porous container with a solution-tight piston which can yield to pressure by moving away from the container across a path enclosed by a non-porous structure. In another alternative method a hollow needle may be used to bleed off excess pressure.

EXAMPLE 4

138 gms potassium carbonate, 248 gms boric acid and 314 gms germania are intimately mixed together and the mixture is vitrified by melting in a ceramic crucible at 1300° C. While hot, the molten mass is poured into 1000 ml of water at room temperature whereby the glass is broken into numerous fragile particles. The mixture is filtered and both the residue and filtrate are further treated. The residue is ground to powder which is then added back to the filtrate and the combination is heated at 100° C. for 1 hour to dissolve as much solute as possible. The volume of the solution is adjusted to 1000 ml. The potassium borogermanate solution thus obtained contains one mole of $K_2O$, two moles of $B_2O_3$ and 3 moles of $GeO_2$. The solution appears turbid, presumably due to the homogeneous suspension of some undissolved solute in colloidal dimension.

15,000 ml of pH 5.00 acetic acid-sodium acetate buffer solution is prepared as follows 10,000 ml sodium hydroxide solution and 10,000 ml acetic acid solution, each of approximately 0.5 N concentration, are made. The actual concentrations of acetic acid solution and sodium hydroxide solution are determined by titration and are found to be 0.500 N and 0.426 N respectively.

Using these values, a 15,000 ml ph 5.00 acetic acid-sodium acetate buffer is prepared by adding 6420 ml of sodium acetate to 8580 ml of acetic acid.

In each of the following experiments, a dialyzer tube 0.5" in diameter and 20" in length is closed at one end and is partially filled with 75 ml aqueous potassium borogermanate solution. The open end of the dialyzer tube is fastened to a support and the tube is suspended vertically in 5000 ml acetic acid-sodium acetate buffer solution so that 75% of the solution within the dialyzer tube is immersed in buffer solution and the other 25% of the solution stays above the buffer solution. After the desired length of time, the deposited porous glass body is taken out and is separated from the dialyzer tube. The porous glass tube is washed with water five times and dried at room temperature for two days. The samples from several locations of the inside glass tubes are analyzed for potassium oxide concentration. The results of various experiments are shown in Table 5.

TABLE 5

| Experiment No. | Duration of Combination of Solution in hours | Weight of $K_2O$ per 100 gms of porous glass on a dry basis | |
|---|---|---|---|
| | | Outside Wall | Inside Wall |
| 13 | 10 | 0.25 gm | 30 gms |
| 14 | 35 | 0.25 gm | 17 gms |
| 15 | 57 | 0.25 gm | 5 gms |

This example demonstrates the use of a complex solute (consisting of more than two oxides) in the first solution and the use of a buffered second solution containing an organic acid. Further, this example demonstrates the existance of a composition profile which is a function of time.

EXAMPLE 5

To 1000 ml vigorously boiling distilled water is added drop by drop, a freshly prepared solution made by dissolving 5 gms of ferric chloride in 5 cc of water. As each drop falls into the boiling water, ferric chloride suffers hydrolysis, forming a beautiful deep red ferric oxide sol. The sol obtained is rapidly dialyzed in a cellophane bag against warm water to free it from the hydrochloric acid and undecomposed ferric chloride. The purified sol is then concentrated to a volume of 10 ml by slow evaporation.

In the following experiment (Experiment No. 16) 75 ml red colloidal solution is prepared by uniformly mixing 70 ml of 40° Be aqueous sodium silicate and 5 ml of ferric oxide sol. A dialyzer tube 0.5" in diameter and 20" in length is closed at one end and is partially filled with 75 ml red colloidal solution. The open end of the dialyzer tube is fastened to a support and the tube is suspended vertically in 5000 ml 0.75% aqueous ammonium nitrate solution so that 75% of the solution within the dialyzer tube is immersed in ammonium nitrate solution and the other 25% of the solution stays above the ammonium nitrate solution. After 30 hours, the deposited red porous body is taken out and is separated from the dialyzer tube. The deposited porous body on analysis showed the presence of ferric oxide. The average room temperature recorded during the experiment was 24° C.

This example demonstrates the use of an additive in the first solution to incorporate a modifying compound in the deposited porous body.

EXAMPLE 6

In the following experiment (Experiment No. 17), a dialyzer tube 0.5" in diameter and 20" in length is closed at one end and partially filled with 75 ml of 40° aqueous sodium silicate solution. The open end of the dialyzer tube is fastened to a support and the tube is suspended vertically in 5000 ml 0.5% aqueous ammonium chloride solution so that 75% of the solution within the dialyzer tube is immersed in ammonium chloride solution and the other 25% of the solution stays above the ammonium chloride solution. After 25 hours of reaction, the solution within the dialyzer tube is replaced by 70 ml of aqueous potassium borogermanate solution as prepared in Example 4; other conditions of the experiment remain unchanged. The reaction is allowed to continue for another 25 hours. The deposited composite porous glass is taken out and is separated from the dialyzer tube. The average temperature recorded during the experiment is 27° C. The porous body, after washing with water 2 times, is leached with 0.005 N $H_2SO_4$ at 27° C. for 10 hours to remove sodium ions and potassium ions and then washed with water to remove acids. The porous body after washing is dried at 21° C. for 48 hours to remove most of the physically bound water. It is heated under vacuum at the rate of 100° C. per hour up to 600° C. The vacuum is then taken off and the porous glass is treated with $SO_3$ vapor for 2 hours at 600° C. This process removes chemically bound water. The porous glass is subjected to vacuum again and the temperature is raised again at the rate of 100° C. per hour until the porous body is consolidated at 1450° C. to a transparent non-porous glass tube. The tube is a composite with the outer wall substantially made of silica and the inner wall substantially made of germania.

EXAMPLE 7

In the following experiment (Experiment No. 18) doping with cesium salt is performed using the porous silica glass made in Example 3. For good optical quality, both the cesium salt and the porous glass need to be purified. The purification of porous glass is done by leaching with 0.005 N $H_2SO_4$ at 27° C. for 10 hours. A more severe leaching condition is next adopted by leaching the porous glass with 2 N $H_2SO_4$ at 95° C. for 24 hours. The tube is washed with water to remove acids and is ready for the doping operation.

Commercial grade $CsNO_3$ contains 3–5 ppm of iron which is detrimental to the optical quality of a glass. It is found that a solution of $CsNO_3$ saturated at 100° C. has a pH of 6, at which some iron must precipitate in order to maintain the solubility product of $Fe(OH)_3$ at its extremely low value. 250 ml of solution of $CsNO_3$ saturated at 100° C. is vigorously boiled under reflux for 6 hours. The solution turns reddish due to precipitation of $Fe(OH)_3$. The hot solution is quickly filtered to remove $Fe(OH)_3$ and the filtered solution is cooled to crystallization at 23° C. The crystals are separated by filtration and the filtrate which is a saturated solution of $CsNO_3$ in water at 23° C. is used in the doping process.

To 100 ml of $CsNO_3$ solution is added 200 ml of liquid $NH_3$. The purified porous glass tube is dipped into the above solution. In this process, the protons from the porous glass are replaced by the cesium ions. The ion exchange is complete in three days. The tube which looks white is washed with water to remove $CsNO_3$ and $NH_3$. The tube is dried at 23° C. for 48 hours to remove most of the physically bound water. It is heated under vacuum at the rate of 100° C. per hour up to 600° C. It is held at that temperature for 2 hours. The temperature is raised again at the rate of 100° C. per hour until the porous body is consolidated at 1450° C. to a transparent non-porous glass tube.

It is found that the first solution and the second solution used in the above examples would form a gel when combined without the use of a porous container. The use of a porous container densifies the gel structure which is intraconnected so as to form a selfsupporting porous structure. Thus, although the discussion and the example mainly concern themselves with the formation of certain inorganic oxide porous bodies by acid-base type reactions within a porous container, any reaction in which the reactants fulfill the requirement of gel formation and the requirements for permeability for one and impermeability for the other will be suitable for formation of a porous self-supporting body. Thus manufacture of metallic glasses, organic glasses and other inorganic glasses is possible by the process of this invention. In the method thus generalized for low temperature synthesis of a porous self-supporting body a first solution containing at least one first solute and a second solution containing at least one second solute are provided, wherein the first solution is capable of reacting with the second solution to form a gel. The first solution is confined within a porous container the walls of which are substantially impermeable to the first solute and the second solution is diffused into the porous container the walls of which are substantially permeable to the second solute. Within the porous container the reaction between the first solution and the second solution takes place to deposit a porous self-supporting body on the walls. The selection of the concentration of the first solution and of the concentration of the second solution are done by trial and error.

The first solution and/or the second solution may contain additives to have desired effects. The additives are, for example, peptizing agents, coagulating agents, protective colloids, structure modifiers and composition modifiers as known in the art. Additives offer resistance to the movement of the first solute and this may cause an otherwise permeable (through the walls of the porous container) first solute to become apparently an impermeable one. A weakly gel forming reaction can be converted into a strongly gel forming one by use of certain additives. The porous self-supporting body can be purified, dried and consolidated to a non-porous body. The following table summarizes different types of reactions which can be used to synthesize a porous self-supporting body.

TABLE 6

| Type of reaction | First solute | Second solute |
| --- | --- | --- |
| Acid-Base | Basic such as examples in Table 1 | Acidic such as examples in Table 2 |
| Oxidation-Reduction | Acidic such as ZrOCl$_2$ | Basic such as (NH$_4$)$_2$CO$_3$ |
| | Oxidant such as PdCl$_2$, RuCl$_3$ KAuCl$_4$, RhCl$_3$ Na$_2$PtCl$_6$ | Reductant such as borohydride, formaldehyde, hypophosphite, hydroxylamine, dextrin p-phenylene diamine hydrosulfite |
| | Reductant such as | Oxidant such |

TABLE 6-continued

| Type of reaction | First solute | Second solute |
| --- | --- | --- |
| | Sn(NO$_3$)$_2$ | as Hg(NO$_3$)$_2$ |
| Hydrolysis | Halides, esters and ethers of silicon, germanium, titanium, boron, phosphorous | Water |
| | Sodium silicate | Sodium aluminate |
| Miscellaneous | Silver nitrate | Potassium iodide |
| | Sodium thiosulfate | Sulfuric acid |

By using the process of this invention vitreous bodies and their intermediates can be made at a much lower cost, with much higher purity, in virtually unlimited compositions and in virtually unlimited shapes. It has a great deal of operational flexibility which is a contrast to the tedious conventional process. The simplicity of the process allows it to be practiced in a light chemical facility provided with a minimal number of process accessories. Most of the raw materials useful for the process are cheap, easily available and pose very little danger to the environment. Many of the raw materials can be made indigenously. Atmospheric pollution due to emission of harmful gases is totally absent in many cases and this is a big plus over direct melting processes where pollution is caused by oxides of nitrogen, phosphorous, arsenic, carbon and sulfur.

The porous self-supporting body prepared by this invention has many desirable physical and chemical properties. These are high refractoriness, chemical inertness, large surface area, controlled porosity and exceptional purity. The main uses of the porous body are as a filtering medium, as a carrier, as an absorbent and as an ion-exchange medium.

Dispersed solids can be separated from liquids and gases by means of the porous body. The separation is based on the molecular size and the porous body can be used for purification of toxic gases and polluted air and for separation of suspended impurities from waste water.

Dissolved solute on the other hand, can be separated from the solvent by hyperfiltration using a membrane made from the porous body of this invention. For this purpose the porous body is considered to be superior to the organic membrane commonly used. Use of an asymmetric membrane will contribute to more efficiency. The separation is based on reverse osmosis and can be used for desalination of saline water, purification of waste water and separation of mixtures of fluids from one another.

Dissolved solutes can be separated from one another by ultrafiltration using a membrane made from the porous body of this invention. As in the case of hyperfiltration, an asymmetric membrane will be found more useful in this case. The separation is based on molecular sizes and can be used in laboratory and industrial dialysis. When coated with non-thrombogenic material, the membrane can be used in an artificial kidney.

Other potential uses of ultrafiltration or hyperfiltration using a membrane made from a porous body of this invention are in the dairy industry, in food processing, in pulp and paper manufacture and in electroplating waste treatment. The membrane useful for ultrafiltration and hyperfiltration can be in the form of flat membranes, tubes or hollow fibers which are easy to fabricate by following the process of this invention.

The porous body can be used for chromatographic applications and as a carrier for biologically active materials such as antigens, antibodies and enzymes. As a catalytic support, the porous body will find applications in chemical process industries like petroleum refineries and in the catalytic converters of internal combustion engines.

The porous body of this invention is a strong absorbent for certain types of molecules which may be solids, liquids or gases. As an absorbent, it can purify liquids and gasses like purification of air in an enclosed space and purification of beer and wine. It can be used as a drying agent to remove moisture from a system. It can be used to separate a mixture of gases and mixture of liquids which are not readily separable by any other means. An example is the separation of n-hexane and n-octane.

The porous body of this invention is a very good medium for ion exchange. The exchange is conveniently done by following the procedure disclosed in pending application, Ser. No. 832,230, filed Sept. 12, 1977, by M. Samanta. A prospective use will be purification of of nuclear waste liquid containing radiocesium $Cs^{137}$. When a porous body immersed in waste liquid is treated with $NH_3$, $Cs^{137}$ will be absorbed in the porous body and other radioactive impurities like radiostrontium will be precipitated. The precipitate and porous body will be separated from the liquid which will thus be free from the radioactive material. The precipitate can be properly sealed in a suitable container and the porous body can be consolidated before disposal of the concentrated waste. An alternate procedure will be to exchange the protons in the porous body with $Li^+$, $Na^+$ or $K^+$ and then treat the nuclear waste liquid with the exchanged porous body whereby all the radioactive cations will be absorbed within the porous body. A porous body exchanged with an alkali metal cation can be used for water softening, absorbing $Ca^{++}$ and $Mg^{++}$ during the process.

The porous body prepared by this invention is hydrophilic and it has strong affinity for water. A membrane made from the body is readily wetted by water. The membrane will allow the water to pass through, but no air or gas entrained in the liquid will be able to pass. This property makes the membrane useful for intravenous injection devices where passage of air into the veins has to be prevented by all means.

The porous body prepared by this invention can be made hydrophobic by coating the hydrophilic surface with a hydrophobic material or by deactivating the surface hydroxyl groups. A membrane made from a body so treated will not be wetted by water. The membrane will allow air to pass through, but no water entrained in the air will be able to pass. Typical use of the membrane will be in the design of vents. The hydrophobic porous body has a strong affinity for gasoline and oil. So, it can be used for removal of water from gasoline and for removal of oil slicks from sea water.

The porous body can be used as filter and reinforcement for polymeric material and as a thermal insulator for home and industry. It can be used as an intermediate in processes for making foam glasses.

Other uses of the porous body made by this invention are as an electrolytic separator in an electrochemical cell, as a microorganism-impervious cover for medical containers, as a matrix for a composite super conductive body and as a carrier for dynamically produced reverse osmosis membranes.

The consolidated glass having a composition profile will have two basic uses. One will be glass strengthening, wherein glass will have a compressive skin because of the composition profile. Typical uses may be in high strength radar homes, and in chemical strengthening of laboratory and commercial glassware. The second basic use will be in fiberoptics. Because of the very high purity and the composition profile, glass will be used in making step-index and graded index optical fibers for optical communication and medical endoscopy.

The proposed uses of consolidated glass without any profile potentially are many. This invention permits the making of glass within such wide limits of composition that virtually any desired mechanical, chemical, optical and dielectric property can be obtained by selecting a suitable composition. Important uses of consolidated glass should include the uses related to household glassware, general laboratory equipment, packaging for electronic components, mirror blanks for astronomical telescopes, acoustic delay lines, windshields for supersonic vehicles, accessories for thermonuclear reactors, and nose cones for intercontinental ballistic missiles.

Of course, many variations and modifications of the subject invention are possible in the light of the above teachings. It is, therefore, to be understood that within the scope of the appended claims, the invention may be practiced otherwise than as specifically described.

I claim:

1. A method for the synthesis of a porous self-supporting body, comprising the steps of:
   providing a first solution containing at least one basic glass forming solute wherein said at least one basic glass forming solute is selected from the group consisting of borates, aluminates, silicates, germanates, stannates, plumbates, phosphates, arsenates, antimonates, bismuthates, selenates, tellurates, zirconates, titanates, tungstates, vanadates and molybdates;
   providing a second solution containing at least one acidic solute wherein said at least one acidic solute is selected from the group consisting of acids and salts of strong acids and weak bases;
   providing in contact with and separating said solutions a permeable barrier substantially impermeable to said at least one basic solute and substantially permeable to said at least one acidic solute; and
   permitting said second solution to pass through said barrier to react with said first solution to deposit on the side of said barrier in contact with said first solution a porous self-supporting body.

2. The method of claim 1 wherein said permeable barrier is a dialyzer membrane.

3. The method of claim 1 wherein said first solution is a true solution.

4. The method of claim 1 wherein said first solution is a colloidal solution.

5. The method of claim 1 and including the step of varying the time during which said solutions are in contact with said barrier so as to obtain a certain thickness for said deposited self-supporting body.

6. The method of claim 1 wherein said deposited self-supporting body is crystalline.

7. The method of claim 1 wherein said deposited self-supporting body is partially vitreous and partially crystalline.

8. The method of claim 1 wherein said deposited self-supporting body is vitreous.

9. The method of claim 1 and including the step of heating said porous body to consolidate it into a non-porous vitreous body.

10. The method of claim 1 and including the steps of:
leaching said porous body with acid;
washing said porous body with water;
drying said porous body; and
heating said porous body to consolidate it into a non-porous vitreous body.

11. The method of claim 1 and including the step of doping said porous body.

12. A product made by the process of claim 1.

13. A product made by the process of claim 9.

14. The method of claim 1 wherein said first solution contains an additive.

15. The method of claim 1 wherein said second solution contains an additive.

16. The method of claim 1 wherein said first and second solutions contain additives.

17. The method of claim 1 and including the step of varying the rate of deposition of said self-supporting body.

18. The method of claim 1 and including the step of varying the rate of reaction by varying the concentrations of said solutions.

19. The method of claim 1 and including the step of varying the rate of reaction by varying the temperature of said solutions.

20. The method of claim 1 and including the step of varying the rate of reaction by varying the relative pressures of said solutions.

21. The method of claim 1 and including the step of varying the porosity and pore size of said self-supporting body by varying the concentrations of said first and second solutions.

22. The method of claim 1 and including the step of varying the porosity and pore size of said self-supporting body by varying the concentration of said first solution.

23. The method of claim 1 and including the step of varying the porosity and pore size of said self-supporting body by varying the concentration of said second solution.

24. The method of claim 1 wherein the concentration of said first solution is such that one liter of said first solution contains from 0.10 moles to 40 moles of at least one glass forming oxide.

25. The method of claim 1 wherein the solvents for said first and second solutions are selected from the group consisting of water, hydrocarbons, alcohols, ketones, ethers, carboxylic acids and mixtures thereof.

26. The method of claim 1 wherein said at least one basic solute is a simple solute consisting of two oxides.

27. The method of claim 1 wherein said at least one basic solute is a complex solute consisting of more than two oxides.

28. The method of claim 1 wherein said at least one acidic solute is a salt of a strong acid and a weak base.

29. The method of claim 1 wherein said at least one basic solute is selected from the group consisting of silicates and germanates.

30. The method of claim 1 wherein said barrier is in the form of a container with said first solution on the inside of said container and said second solution on the outside of said container.

31. The method of claim 1 wherein said barrier is in the form of a shaped article whereby said porous self-supporting body conforms to the shape of said barrier.

32. A product made by the process of claim 31.

33. The method of claim 1 and including the step of changing the compositions and said first solution and said second solution during deposition of said self-supporting body to develop in said body, layers of different composition.

34. The method of claim 1 and including the step of changing the composition of said first solution during deposition of said self-supporting body to develop in said body, layers of different composition.

35. The method of claim 1 and including the step of changing the composition of said second solution during deposition of said self-supporting body to develop in said body, layers of different composition.

36. The method of claim 1 and including the step of continuously varying the composition of said first solution and said second solution during deposition of said self-supporting body to develop in said body a continuous variation in composition.

37. The method of claim 1 and including the step of continuously varying the composition of said first solution during deposition of said self-supporting body to develop in said body a continuous variation in composition.

38. The method of claim 1 and including the step of continuously varying the composition of said second solution during deposition of said self-supporting body to develop in said body a continuous variation in composition.

39. The method of claim 1 and including the step of varying the time during which said solutions are in contact with said barrier so as to develop a certain composition profile for said porous self-supporting body.

* * * * *